United States Patent
Duret

(10) Patent No.: US 8,557,090 B2
(45) Date of Patent: Oct. 15, 2013

(54) HIGH-PRESSURE ELECTROLYSIS INSTALLATION AND PROCESS FOR INERTISING AN INSTALLATION OF THIS TYPE

(75) Inventor: Alexis Duret, Lausanne (CH)

(73) Assignee: Swiss Hydrogen Power SHP SA, Fribourg (CH)

( * ) Notice: Subject to any disclaimer, the term of this patent is extended or adjusted under 35 U.S.C. 154(b) by 666 days.

(21) Appl. No.: 12/668,646

(22) PCT Filed: Jul. 9, 2008

(86) PCT No.: PCT/EP2008/005583
§ 371 (c)(1),
(2), (4) Date: Jul. 1, 2010

(87) PCT Pub. No.: WO2009/007096
PCT Pub. Date: Jan. 15, 2009

(65) Prior Publication Data
US 2010/0264038 A1    Oct. 21, 2010

(30) Foreign Application Priority Data
Jul. 11, 2007    (EP) .................................. 07112288

(51) Int. Cl.
*C25B 15/02* (2006.01)
*C25B 1/04* (2006.01)

(52) U.S. Cl.
USPC ........................................ 204/229.4; 205/628

(58) Field of Classification Search
USPC ........................................ 204/229.4; 205/628
See application file for complete search history.

(56) References Cited

U.S. PATENT DOCUMENTS

| | | | |
|---|---|---|---|
| 4,214,969 A | 7/1980 | Lawrance | |
| 6,685,821 B2 | 2/2004 | Kosek et al. | |
| 2003/0029734 A1 | 2/2003 | Andrews et al. | |
| 2004/0040862 A1* | 3/2004 | Kosek et al. | 205/637 |
| 2005/0072688 A1 | 4/2005 | Meltser | |

FOREIGN PATENT DOCUMENTS

DE    38 37 354 A1    5/1990

OTHER PUBLICATIONS

International Search Report issued in corresponding application No. PCT/EP2008/005583, completed Mar. 5, 2009 and mailed Mar. 11, 2009.

* cited by examiner

*Primary Examiner* — Nicholas A Smith
(74) *Attorney, Agent, or Firm* — Griffin & Szipl, P.C.

(57) ABSTRACT

An electrolysis installation for decomposing water into hydrogen and oxygen comprises: an electrolysis stack; a water recirculation system supplying water to the stack and comprising a circuit and a recirculation pump, first and second separators for separating from water hydrogen and oxygen respectively produced in the stack; a hydraulic supply means supplying the recirculation circuit with deionised water to compensate for water consumed by production of gaseous hydrogen and oxygen, and an extinguishing means for inertising the first and second separators when the installation is shut down, wherein the extinguishing means comprises first and second relief valves provided on the first and second separators, respectively, wherein the valves relieve pressure in the two separators simultaneously while keeping the water level inside the two separators substantially constant, and the extinguishing means controls the supply means to completely fill the two separators with water once the two separators are relieved of pressure.

12 Claims, 2 Drawing Sheets

HIGH-PRESSURE ELECTROLYSIS INSTALLATION AND PROCESS FOR INERTISING AN INSTALLATION OF THIS TYPE This is a National Phase Application in the United States of International Patent Application No. PCT/EP2008/005583 filed Jul. 9, 2008, which claims priority on European Patent Application No. 07112288.1 filed Jul. 11, 2007. The entire disclosures of the above patent applications are hereby incorporated by reference.

FIELD OF THE INVENTION

The present invention relates to a high-pressure electrolysis installation for decomposing water into hydrogen and oxygen. It relates more specifically to an installation of this type comprising an electrolysis stack consisting of a plurality of electrolytic cells, each comprising an anode and a cathode. The installation further comprises a water recirculation system supplying water to the anodes and cathodes. The recirculation system itself comprises a water recirculation circuit, a recirculation pump, a first separator for separating the water and the gaseous hydrogen produced in the electrolysis stack and a second separator for separating the water and the oxygen produced in the electrolysis stack, the installation further comprising hydraulic supply means for supplying the recirculation circuit with deionised water so as to compensate for the water consumed by the production of gaseous hydrogen and oxygen, and lastly comprising extinguishing means for inertising the first and second separators when the installation is shut down.

The present invention also relates to a process for inertising an installation of the type described above when it is shut down.

BACKGROUND OF THE INVENTION

Electrolysis installations in accordance with the above preamble are already known. A prior art installation of this type is shown schematically in the appended FIG. 1. The diagram shows a pressure chamber 3 enclosing an electrolysis stack 5, a first separator 7 and a second separator 9. It will be noted in this regard that in some variant embodiments of these installations, the pressure chamber can be omitted. A double recirculation circuit 11, 13 is provided to supply the electrolysis stack with electrolyte (in the present case, water in which a suitable substance, such as potassium hydroxide for example, is dissolved. The recirculation circuit 11, 13 is a double circuit. It is formed of a cathodic circuit 11 passing through the cathodes of the electrolysis stack, as well as an anodic circuit 13 passing through the anodes. The two circuits 11 and 13 have a shared portion that passes through a recirculation pump 15. The purpose of the pump 15 is to circulate the electrolyte in a loop in the double recirculation circuit 11, 13. Upon exiting the stack 5, part of the electrolytic solution is taken into the cathodic circuit 11 as far as the first separator 7, whilst the rest of the solution is taken into the anodic circuit as far as the second separator 9. The liquid taken from the cathodes to the first separator 7 contains gaseous hydrogen. Similarly, the liquid taken from the anodes contains gaseous oxygen. The separation of the liquid and gas takes place in the separators 7, 9. The degasified liquid is then returned to the recirculation pump 15.

The hydrogen and oxygen accumulate in the respective upper parts of the two separators. The first separator 7 is provided with a pressure regulation valve 17, which determines the working pressure of the installation as a whole (generally between 5 and 30 bar). When the pressure inside the separator 7 reaches the limit value of the valve 17, the valve allows the hydrogen that has been produced to escape. Because oxygen continues to accumulate in the second separator 9 during this time, the water level in the separator decreases and, in accordance with the principle of communicating vessels, the water level inside the first separator 7 increases. The two separators are each provided with a level gauge (denoted as 19 and 20 respectively). The second separator 9 is further equipped with a pressure relief valve 23, and when the gauges indicate that the difference in level in the separators has exceeded a predetermined value, the valve 23 opens and allows oxygen to escape until the two levels become equal.

The operation of the electrolysis installation involves progressive destruction of the water, which it contains. When the sum of the water levels in the two separators falls below a predetermined value, hydraulic supply means are triggered to supply cold water to the recirculation circuit 11, 13. As is shown in FIG. 1, the hydraulic supply means comprise a reservoir of deionised water 25 and a pipe 28 that connects the reservoir to the recirculation circuit. A supply pump 27 is further provided to pass the cold water into the recirculation circuit.

The electrolysis installation is further provided with extinguishing means for inertising the first and second separators when the installation is shut down. The extinguishing means comprise a reserve of pressurised nitrogen 30 and a supply pipe 32 connecting the nitrogen reserve to the two separators 7, 9. When it is sought to shut down the installation, a valve 34 is opened, causing the nitrogen to flow into the separators, preferably in a large amount. Simultaneously, a relief valve 36 on the first separator 7 and the relief valve 23 on the second separator 9 are opened. Thus, the nitrogen exits the first separator through the valve 36, carrying along the hydrogen contained in the separator 7. Similarly, the nitrogen can escape via the valve 23, carrying with it the oxygen contained in the separator 9. This way of proceeding allows the two separators to be emptied and thus in particular allows any risk of explosions, in connection with the presence of hydrogen, to be avoided.

Electrolysis installations of the same type as those that have just been described exhibit some drawbacks. First, the extinguishing means make it necessary to have a large amount of pressurised nitrogen available. Furthermore, the hydrogen contained in the first separator 7 is lost during inertisation because it is mixed with a large amount of nitrogen and then released into the atmosphere.

SUMMARY OF THE INVENTION

The present invention aims in particular to overcome the above-mentioned drawbacks. This object is achieved by providing an electrolysis installation of the type described in the preamble, characterised in that the extinguishing means comprise a first and a second relief valve provided on the first and second separators respectively, wherein the relief valves are provided to relieve the pressure in the two separators simultaneously while keeping the water level inside the two separators substantially constant, and in that the extinguishing means are provided to control the hydraulic supply means so as to completely fill the two separators with water once the two separators have been virtually relieved of pressure.

It will be understood that according to the present invention, the hydraulic supply means of the installation are used to supply the inertising fluid for the separators. This feature means that it is not necessary to provide a pressurised nitrogen reserve, and this greatly reduces the maintenance costs of the electrolysis installation.

Furthermore, the hydraulic supply means are the same ones as are provided to replenish the cold water of the recirculation circuit 11 in normal operation. The fact that the same equipment is used during the extinguishing phase and during the normal operating phases allows the design of the invention to be greatly simplified.

In an advantageous variant of the present invention, the hydrogen driven out of the first separator during the inertisation phase, when the two separators 7, 9 are completely filled with water, is recovered instead of being released into the atmosphere. In fact, since the hydrogen is not mixed with nitrogen, its quality is not affected by the inertisation process and it can thus be recovered.

Preferably, the extinguishing means are also provided to interrupt the electricity supply of the electrolysis stack before the pressure relief valves are opened. In another preferred feature, the extinguishing means can be provided to make the hydraulic supply means start filling the two separators when the hydrogen pressure in the first separator has fallen below two bars.

In another advantageous feature, the extinguishing means control the hydraulic supply means automatically. The two pressure relief valves may also advantageously be controlled automatically. In a preferred embodiment, the first pressure relief valve releases hydrogen into the atmosphere.

In another aspect, the present invention also aims to overcome the above drawbacks by providing an electrolysis installation of the type described in the preamble, characterised in that the hydraulic supply means comprise a reservoir of deionised water, connected to a pipe for placing the reservoir in communication with the recirculation circuit upstream from the entrance of the recirculation pump, and in that the pipe is provided with a valve provided to open when the amount of water in the recirculation system has fallen below a predefined level.

In a preferred feature of this second aspect, the pipe is provided with a backflow preventer. Furthermore, in an advantageous embodiment, the recirculation circuit is provided with a recirculation valve arranged upstream from the point where this pipe meets the recirculation circuit, wherein the recirculation valve is provided to reduce the flow of water from the two exchangers so as to increase the proportion of the water coming from the hydraulic supply means.

In yet another aspect, the invention relates to a process for inertising a high-pressure electrolysis installation for decomposing water into hydrogen and oxygen when the installation is shut down, wherein the installation comprises an electrolysis stack consisting of a plurality of electrolytic cells, each comprising an anode and a cathode, a water recirculation system supplying water to the anodes and cathodes, the recirculation system comprising a water recirculation circuit, a recirculation pump, a first separator for separating from the water the gaseous hydrogen produced in the electrolysis stack and a second separator for separating from the water the oxygen produced in the electrolysis stack, and the installation further comprises hydraulic supply means for supplying the recirculation circuit with deionised water so as to compensate for the water consumed by the production of gaseous hydrogen and oxygen, and lastly comprising extinguishing means for inertising the first and second separators when the installation is shut down, and in which the extinguishing means comprise a first and a second pressure relief valve provided on the first and second separators respectively, wherein the process is characterised in that it comprises the steps of: (1) simultaneously relieving the pressure in the two separators while keeping the water level inside the two separators substantially constant, and (2) controlling the hydraulic supply means so as to completely fill the two separators with water once the two separators have been virtually relieved of pressure.

In an advantageous embodiment of the process, the electrical supply of the electrolysis stack is interrupted before the pressure relief valves are opened, and the two separators are filled by the hydraulic supply means when the pressure of the hydrogen in the first separator has fallen below two bars.

Preferably, the hydraulic supply means and the two pressure relief valves are controlled automatically and the first pressure relief valve (36) releases hydrogen into the atmosphere.

Moreover, with respect to a first non-limiting illustrative embodiment of the present invention, a high-pressure electrolysis installation is provided for decomposing water into hydrogen and oxygen, wherein the installation includes: (a) an electrolysis stack (5) consisting of a plurality of electrolytic cells, each comprising an anode and a cathode; (b) a water recirculation system supplying water to the anodes and cathodes, wherein the recirculation system comprises a water recirculation circuit (11, 13), a recirculation pump (15), a first separator (7) for separating from the water the gaseous hydrogen produced in the electrolysis stack (5) and a second separator (9) for separating from the water the oxygen produced in the electrolysis stack (5), wherein the installation further includes (c) hydraulic supply means for supplying the recirculation circuit (11, 13) with deionised water so as to compensate for the water consumed by the production of gaseous hydrogen and oxygen, and lastly the installation includes (d) extinguishing means for inertising the first and second separators (7, 9) when the installation is shut down, wherein the installation is characterised in that the extinguishing means comprise a first and a second relief valve (36, 23) provided on the first and second separators (7, 9) respectively, wherein the relief valves are provided to relieve the pressure in the two separators simultaneously while keeping the water level inside the two separators substantially constant, and in that the extinguishing means are provided to control the hydraulic supply means so as to completely fill the two separators (7, 9) with water once the two separators have been virtually relieved of pressure. In accordance with a second non-limiting illustrative embodiment of the present invention, the second non-limiting embodiment is modified so that the extinguishing means are also provided to interrupt the electricity supply of the electrolysis stack (5) before the pressure relief valves (36, 23) are opened.

In accordance with a third non-limiting illustrative embodiment of the present invention, the first non-limiting embodiment is modified so that the extinguishing means are provided to make the hydraulic supply means start filling the two separators (7, 9) when the hydrogen pressure in the first separator (7) has fallen below two bars. In accordance with a fourth non-limiting illustrative embodiment of the present invention, the first non-limiting embodiment is modified so that the extinguishing means control the hydraulic supply means automatically. In accordance with a fifth non-limiting illustrative embodiment of the present invention, the first non-limiting embodiment is modified so that the two pressure relief valves (36, 23) are controlled automatically. In accordance with a sixth non-limiting illustrative embodiment of the present invention, the first non-limiting embodiment is modified so that the first pressure relief valve (36) releases hydrogen into the atmosphere.

In accordance with a seventh non-limiting illustrative embodiment of the present invention, a high-pressure electrolysis installation is provided for decomposing water into hydrogen and oxygen, wherein the installation includes: (a) an electrolysis stack (5) consisting of a plurality of electrolytic cells, each comprising an anode and a cathode; (b) a water recirculation system supplying water to the anodes and cathodes, wherein the recirculation system comprises a water recirculation circuit (11, 13), a recirculation pump (15), a first separator (7) for extracting from the water the gaseous hydrogen produced by the operation of the installation and a second separator (9) for extracting from the water the oxygen produced by the operation of the installation, wherein the installation further includes (c) hydraulic supply means for supplying the recirculation circuit with deionised water so as to replace the water consumed during operation of the installation, and lastly the installation includes (d) extinguishing means for inertising the first and second separators (7, 9) when the installation is shut down, wherein the installation is characterized in that the hydraulic supply means comprise a reservoir of deionised water (25), connected to a pipe (28) for placing the reservoir in communication with the recirculation circuit (11, 13) upstream from the entrance of the recirculation pump (31), and in that the pipe is provided with a valve (35) provided to open when the amount of water in the recirculation system has fallen below a predefined level. In accordance with an eighth non-limiting illustrative embodiment of the present invention, the seventh non-limiting embodiment is modified so that the pipe (28) is provided with a backflow preventer. In accordance with a ninth non-limiting illustrative embodiment of the present invention, the seventh non-limiting embodiment is modified so that the recirculation circuit is provided with a recirculation valve (37) arranged upstream from the point where this pipe (28) meets the recirculation circuit (11, 13), and the recirculation valve (37) is provided to reduce the flow of water from the two exchangers (7, 9) so as to increase the proportion of the water coming from the hydraulic supply means.

In accordance with a tenth non-limiting illustrative embodiment of the present invention, a process is provided for inertising a high-pressure electrolysis installation for decomposing water into hydrogen and oxygen when the installation is shut down, wherein the installation comprises (a) an electrolysis stack (5) consisting of a plurality of electrolytic cells, each comprising an anode and a cathode, (b) a water recirculation system supplying water to the anodes and cathodes, wherein the recirculation system comprises a water recirculation circuit (11, 13), a recirculation pump (15), a first separator (7) for separating from the water the gaseous hydrogen produced in the electrolysis stack (5) and a second separator (9) for separating from the water the oxygen produced in the electrolysis stack (5), and the installation further comprises (c) hydraulic supply means for supplying the recirculation circuit (11, 13) with deionised water so as to compensate for the water consumed by the production of gaseous hydrogen and oxygen, and lastly the installation comprises (d) extinguishing means for inertising the first and second separators (7, 9) when the installation is shut down, and in which the extinguishing means comprise a first and a second pressure relief valve (36, 23) provided on the first and second separators (7, 9), respectively, wherein the process is characterised in that it includes the steps of: (1) simultaneously relieving the pressure in the two separators while keeping the water level inside the two separators substantially constant; and (2) controlling the hydraulic supply means so as to completely fill the two separators (7, 9) with water once the two separators have been virtually relieved of pressure. In accordance with an eleventh non-limiting illustrative embodiment of the present invention, the tenth non-limiting embodiment is modified so that the electrical supply of the electrolysis stack (5) is interrupted before the pressure relief valves (36, 23) are opened.

In accordance with a twelfth non-limiting illustrative embodiment of the present invention, the tenth non-limiting embodiment is modified so that the two separators (7, 9) are filled by the hydraulic supply means when the pressure of the hydrogen in the first separator (7) has fallen below two bars. In accordance with a thirteenth non-limiting illustrative embodiment of the present invention, the tenth non-limiting embodiment is modified so that the hydraulic supply means are controlled automatically. In accordance with a fourteenth non-limiting illustrative embodiment of the present invention, the tenth non-limiting embodiment is modified so that the two pressure relief valves (36, 23) are controlled automatically. In accordance with a fifteenth non-limiting illustrative embodiment of the present invention, the tenth non-limiting embodiment is modified so that the first pressure relief valve (36) releases hydrogen into the atmosphere.

BRIEF DESCRIPTION OF THE DRAWINGS

Further features and advantages of the present invention will become clear upon reading the following description, given merely by way of non-limiting example and in reference to the appended drawings, in which.

DETAILED DESCRIPTION OF THE ILLUSTRATIVE EMBODIMENTS

Figure 1:
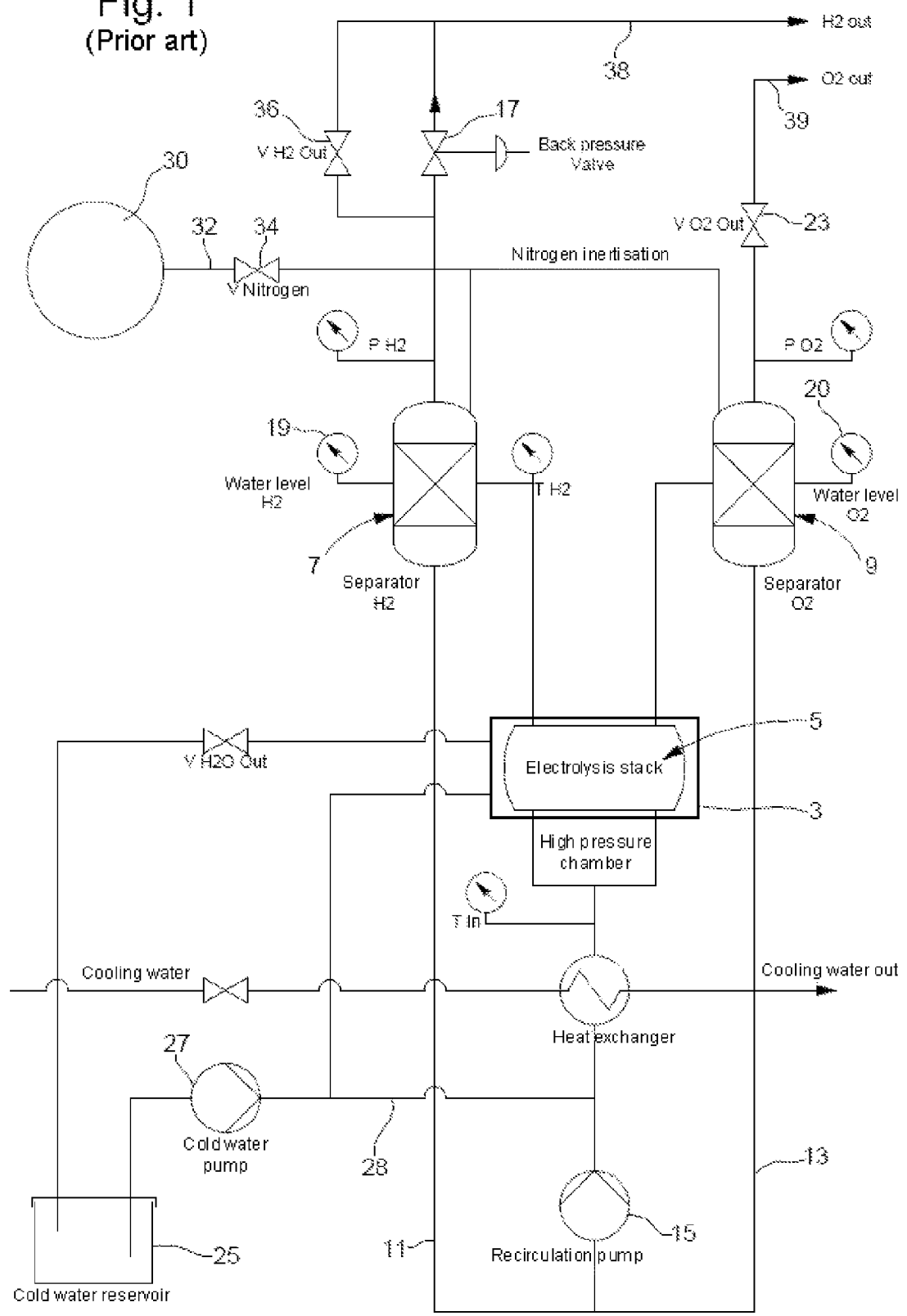
FIG. 1 is a schematic representation of a prior art electrolysis installation.

Simply removing the nitrogen reserve 30, the supply pipe 32 and the valve 34 from the diagram of FIG. 1 provides a schematic representation of a simplified electrolysis installation corresponding to a first embodiment of the present invention.

Apart from the extinguishing phase, the electrolysis installation shown in FIG. 1 operates on exactly the same principle as the prior art installation described above. The only difference lies in the extinguishing phase and the means associated with this phase. In fact, in the present example, when the extinguishing of the installation is triggered, either automatically or by an operator, the pressure relief valves 36 and 23 are opened in a controlled manner so as to relieve the pressure in the two separators simultaneously, while keeping the water level inside the separators substantially constant. The hydrogen and oxygen released by the valves 36 and 23 leave the installation via the exhaust pipes 38 and 39 respectively in order to be recovered. The exhaust pipes 38 and 39 may be the same as those used to remove the gases produced during normal operation of the installation. When the pressure in the separators is relieved, the gauges 19 and 20 control the water level in each separator.

Once the pressure in the separators 7, 9 has fallen below approximately two bars, the hydraulic supply means are started up automatically and supply water to the recirculation circuit so as to increase the level of liquid in the two separators until they are filled completely and thus to expel all of the hydrogen and all of the oxygen contained in the separators.

Once this operation is complete, the supply pump 27 and the recirculation pump 15 are stopped and all of the valves are closed.

Figure 2:
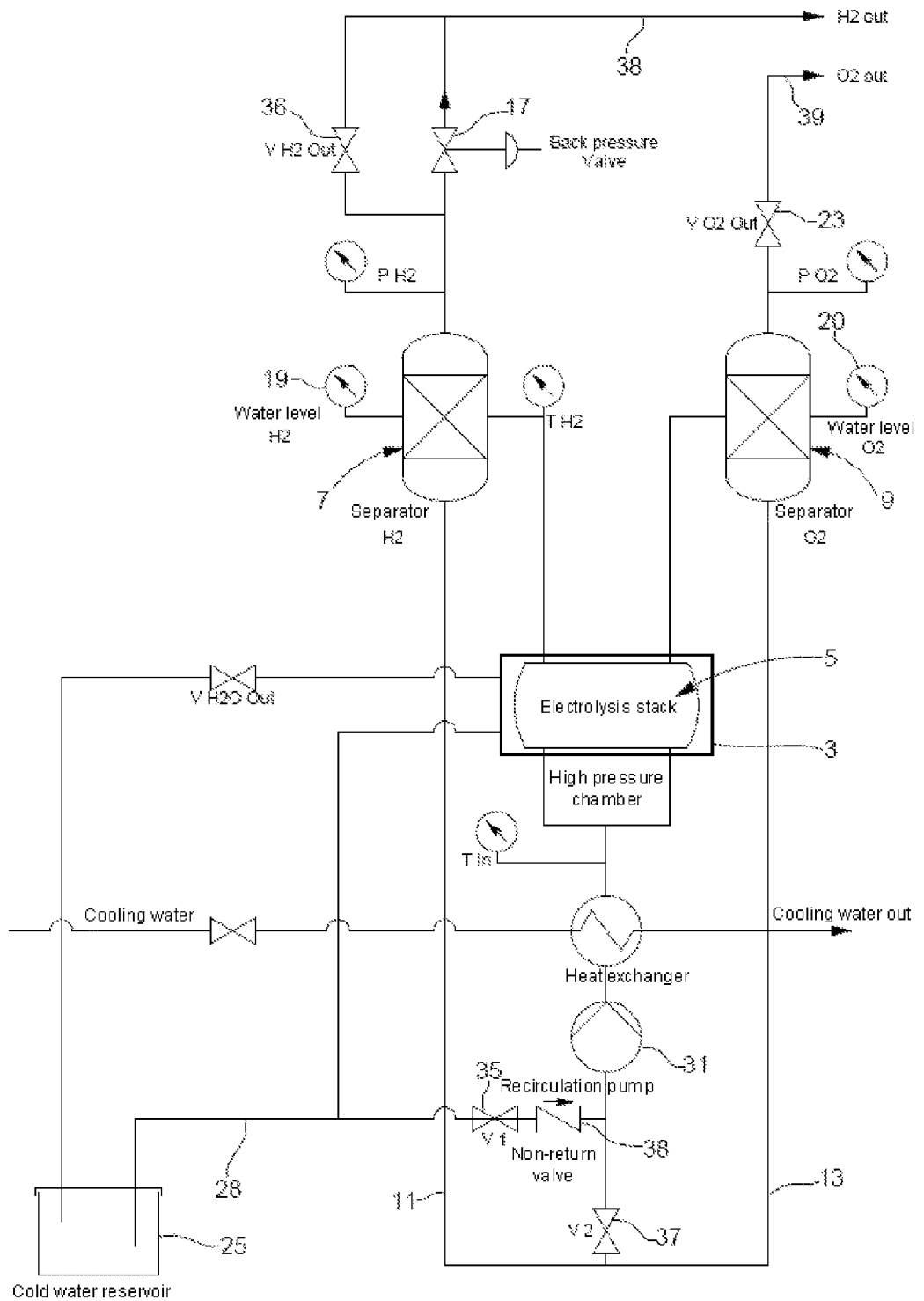
FIG. 2 is a schematic representation of an electrolysis installation according to a particular embodiment of the present invention.

FIG. 2 is a schematic representation of an electrolysis installation according to a second embodiment of the present invention. In FIG. 2, the components already described in connection with FIG. 1 have been provided with the same reference numerals.

The electrolysis installation shown in the drawing of FIG. 2 basically differs from that shown in FIG. 1 in that just one single pump 31 takes on the functions of a recirculation pump and of a supply pump.

For this purpose, the pump 31 is placed downstream from the junction between the pipe 28 and the recirculation circuit 13. The drawing shows that a supply valve 35 is mounted on the circuit 28 in the position where the supply pump 27 was located in the first embodiment. Moreover, a second valve 37 and a non-return valve 38 are mounted on the recirculation circuit upstream from the junction between the circuit and the pipe 28. It will be noted that the anti-return valve can be omitted. It will be understood that by controlling the relative openness of the valves 35 and 37, it is possible to control the relative amount of the supply of cold water relative to the recirculation of electrolyte, without having to use two pumps. The main advantage of the variant of the present example is therefore that it makes it possible to save on one of the two pumps, thus simplifying the installation, limiting the risk of the installation breaking down and making it less expensive.

In sum, the present invention relates broadly to an electrolysis installation for decomposing water into hydrogen and oxygen, which includes: (a) an electrolysis stack (5); (b) a water recirculation system supplying water to the stack, wherein the recirculation system includes a circuit (11, 13) and a recirculation pump (15), a first and a second separator (7, 9) for separating from the water the hydrogen and the oxygen respectively produced in the stack (5), (c) hydraulic supply means that supply the recirculation circuit (11, 13) with deionised water so as to compensate for the water consumed by the production of gaseous hydrogen and oxygen, and (d) extinguishing means for inertising the first and second separators (7, 9) when the installation is shut down, wherein the extinguishing means comprise a first and a second relief valve (36, 23) provided on the first and second separators (7, 9) respectively, and these valves are provided to relieve the pressure in the two separators simultaneously while keeping the water level inside the two separators substantially constant, and by extinguishing means that control the supply means so as to completely fill the two separators (7, 9) with water once the two separators have been relieved of pressure.

It will also be understood that various modifications and/or improvements, which are obvious to a person skilled in the art, can be applied to the embodiment of the present description, without departing from the scope of the present invention as defined in the appended claims. In particular, the subject-matter of the present invention is not limited to electrolysis installations that combine the feature of using the hydraulic supply means for inertisation with the feature of having just one single pump 31 which simultaneously takes on the functions of a recirculation pump and of a supply pump. An electrolysis installation according to the present invention need only comprise either one of these two features.

The invention claimed is:

1. A high-pressure electrolysis installation for decomposing water into hydrogen and oxygen, wherein the installation comprises:
   (a) an electrolysis stack consisting of a plurality of electrolytic cells, wherein each electrolytic cell comprises an anode and a cathode;
   (b) a water recirculation system supplying water to the anodes and cathodes of the plurality of electrolytic cells, wherein the recirculation system comprises
      i. a water recirculation circuit;
      ii. a recirculation pump connected to circulate water in the water recirculation circuit;
      iii. a first separator for separating from the water gaseous hydrogen produced in the electrolysis stack; and
      iv. a second separator for separating from the water oxygen produced in the electrolysis stack;
   (c) hydraulic supply means for supplying the recirculation circuit with deionised water so as to compensate for water consumed by the production of gaseous hydrogen and oxygen; and
   (d) extinguishing means for inertising the first separator and the second separator when the installation is shut down, wherein the extinguishing means comprise a first relief valve and a second relief valve provided on the first separator and the second separator, respectively, wherein the first relief valve and the second relief valve are provided to relieve pressure in the first separator and the second separator simultaneously while keeping a water level inside the first separator and the second separator substantially constant, and the extinguishing means is provided to control the hydraulic supply means so as to completely fill the first separator and the second separator with water once the first separator and the second separator have been virtually relieved of pressure.

2. A high-pressure installation according to claim 1, wherein the extinguishing means is also provided to interrupt an electricity supply of the electrolysis stack before the first relief valve and the second relief valve are opened.

3. A high-pressure installation according to claim 1, wherein the extinguishing means is provided to make the hydraulic supply means start filling the first separator and the second separator when hydrogen pressure in the first separator has fallen below two bars.

4. A high-pressure installation according to claim 1, wherein the extinguishing means controls the hydraulic supply means automatically.

5. A high-pressure installation according to claim 1, wherein the first relief valve and the second relief valve are controlled automatically.

6. A high-pressure installation according to claim 1, wherein the first relief valve releases hydrogen into the atmosphere.

7. A process for inertising a high-pressure electrolysis installation for decomposing water into hydrogen and oxygen when the installation is shut down, wherein the installation comprises
   (a) an electrolysis stack consisting of a plurality of electrolytic cells, wherein each electrolytic cell comprises an anode and a cathode;
   (b) a water recirculation system supplying water to the anodes and cathodes of the plurality of electrolytic cells, wherein the recirculation system comprises
      i. a water recirculation circuit;
      ii. a recirculation pump connected to circulate water in the water recirculation circuit;
      iii. a first separator for separating from the water gaseous hydrogen produced in the electrolysis stack; and
      iv. a second separator for separating from the water oxygen produced in the electrolysis stack;

(c) hydraulic supply means for supplying the recirculation circuit with deionised water so as to compensate for water consumed by the production of gaseous hydrogen and oxygen; and (d) extinguishing means for inertising the first separator and the second separator when the installation is shut down, wherein the extinguishing means comprise a first pressure relief valve and a second pressure relief valve provided on the first separator and the second separator, respectively, wherein the process comprises the steps of:

simultaneously relieving pressure in the first separator and the second separator while keeping a water level inside the first separator and the second separator substantially constant; and controlling the hydraulic supply means so as to completely fill the first separator and the second separator with water once the first separator and the second separator have been virtually relieved of pressure.

8. A process according to claim 7, wherein an electrical supply of the electrolysis stack is interrupted before the first pressure relief valve and the second pressure relief valve are opened.

9. A process according to claim 7, wherein the first separator and the second separator are filled by the hydraulic supply means when pressure of hydrogen in the first separator has fallen below two bars.

10. A process according to claim 7, wherein the hydraulic supply means is controlled automatically.

11. A process according to claim 7, wherein the first pressure relief valve and the second pressure relief valve are controlled automatically.

12. A process according to claim 7, wherein the first pressure relief valve releases hydrogen into the atmosphere.

* * * * *